(12) United States Patent
Flynn et al.

(10) Patent No.: US 6,923,921 B2
(45) Date of Patent: Aug. 2, 2005

(54) FLUORINATED POLYETHER COMPOSITIONS

(75) Inventors: Richard M. Flynn, Mahtomedi, MN (US); Daniel R. Vitcak, Cottage Grove, MN (US); Richard S. Buckanin, Woodbury, MN (US); Cheryl L. S. Elsbernd, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/331,816

(22) Filed: Dec. 30, 2002

(65) Prior Publication Data

US 2004/0124396 A1 Jul. 1, 2004

(51) Int. Cl.$^7$ .......................... C09K 3/00; C07C 43/12; C07C 59/135; C07C 53/48; D06M 13/165

(52) U.S. Cl. .................. 252/182.15; 252/8.62; 568/615; 570/134; 570/126; 562/849; 562/586; 560/184

(58) Field of Search .................. 568/419, 495, 568/615, 560; 570/124, 134, 126; 562/586, 849; 252/8.62, 182.15; 560/184

(56) References Cited

U.S. PATENT DOCUMENTS

| | | |
|---|---|---|
| 2,567,011 A | 9/1951 | Diesslin et al. |
| 3,214,478 A | 10/1965 | Milian et al. |
| 3,242,218 A | 3/1966 | Miller |
| 3,250,808 A * | 5/1966 | Moore, Jr. .................. 562/586 |
| 3,274,244 A | 9/1966 | Mackenzie et al. |
| 3,322,826 A | 5/1967 | Moore |
| 3,446,761 A | 5/1969 | Antonelli et al. |
| 3,536,710 A | 10/1970 | Bartlett |
| 3,553,179 A | 1/1971 | Bartlett |
| 3,555,089 A | 1/1971 | Bartlett |
| 3,621,059 A | 11/1971 | Bartlett |
| 3,766,251 A * | 10/1973 | Caporiccio et al. ......... 560/223 |
| 3,814,741 A | 6/1974 | Milan et al. |
| 3,847,978 A * | 11/1974 | Sianesi et al. .............. 562/577 |
| 4,766,190 A | 8/1988 | Morita et al. |
| 4,864,006 A | 9/1989 | Giannetti et al. |
| 4,975,502 A | 12/1990 | Morita et al. |
| 5,011,713 A | 4/1991 | Lenti et al. |
| 5,208,373 A | 5/1993 | Meyer |
| 5,262,057 A * | 11/1993 | Tonelli et al. .............. 210/656 |
| 5,294,248 A | 3/1994 | Chittofrati et al. |
| 5,424,438 A | 6/1995 | Chittofrati et al. |
| 5,698,138 A | 12/1997 | Visca et al. |
| 6,214,253 B1 * | 4/2001 | Moore et al. ................. 252/70 |

FOREIGN PATENT DOCUMENTS

| | | |
|---|---|---|
| EP | 0 259 980 | 3/1988 |
| EP | 0 250 767 | 9/1991 |
| EP | 0 219 065 | 3/1992 |
| EP | 0 273 449 | 3/1992 |
| EP | 0 615 779 A1 | 9/1994 |
| EP | 0 615 779 B1 | 7/1997 |
| EP | 0 870 778 | 10/1998 |
| EP | 0 947 533 | 10/1999 |
| EP | 1 038 919 | 9/2000 |
| EP | 0 853 638 | 4/2001 |
| JP | 57-70112 | 4/1982 |
| JP | 4-146917 | 5/1992 |
| JP | 10-81873 | 3/1998 |

OTHER PUBLICATIONS

"Principles Of Polymerization", Third Edition, by George Odian, The College of Staten Island The City University of New York Staten Island, New York, pp. 19–24 (1991).*

Millauer et al. in *Angewandte Chemie Int. Ed.*, vol. 24(3), 1985, pp. 161–179.

Ace Glass Catalog, 2002, pp. 112, 116, and 157.

Van Gogh, H., *Pharm. Weehlad*, 1966, 101, 881–898.

* cited by examiner

Primary Examiner—Joseph D. Anthony

(57) ABSTRACT

Described are fluorinated polyether compounds having a molecular weight range between 750 g/mol and 4000 g/mol where such polyether compounds are intermediates used in fluorinated compositions for treating various substrates.

5 Claims, No Drawings

FLUORINATED POLYETHER COMPOSITIONS

1. FIELD OF INVENTION

The present invention relates to a select molecular weight range of fluorinated polyethers as intermediates for preparing useful fluorochemical polymeric compositions.

2. BACKGROUND

Fluorinated polyethers have been known for many years. For example, such polyethers have been described in U.S. Pat. Nos. 3,214,478, 3,242,218, 3,322,826, and by Millauer et al. in *Angewandte Chemie Int. Ed.*, Vol. 24(3), 1995, pp. 161–179, all incorporated herein by reference. These polyfluorinated ethers have been used as intermediates in the preparation of useful compositions to be applied to substrates such as hard surface substrates and fibrous substrates to impart oil and/or water repellant properties. For example, perfluorinated polyether compounds as intermediates in such compositions are described in EP 1,038,919, EP 273,449, JP-A-04-146917, JP-A-10-081873, U.S. Pat. Nos. 3,536,710, 3,814,741, 3,553,179, and 3,446,761.

In seeking these useful and efficient compositions, selection of specific fluorinated polyethers for use is important. For example, there is also a requirement that the fluorochemical compositions be environmentally friendly. By this is meant that fluorochemical polymeric compositions are obtained substantially free of fluorochemical components that eliminate slowly from the body of living organisms.

In addition to environmental friendliness, processing efficiency is also desired to reduce costs and ease in the manufacturing of such fluorochemical compositions.

3. SUMMARY OF THE INVENTION

We have found that fluorochemical compositions derived from a perfluorinated polyether or fluorinated polyether compound having a molecular weight between about 750 g/mol and about 4000 g/mol surprisingly provide environmentally friendly resulting compositions, but also compositions that may be prepared without processing difficulties.

Moreover, it is believed that fluorochemical degradation products that may form from these materials likewise eliminate well from the body of living organisms. In particular, indications show that the fluorinated polyether compounds that have a perfluorinated polyether moiety having a molecular weight of at least 750 g/mol and perfluorinated polyether degradation products that may form therefrom would eliminate more effectively from the body of living organisms. In particular, there are indications that fluorinated polyether compounds having a fluorinated polyether moiety derivable from a polycondensation of hexafluoropropylene oxide and having a molecular weight of at least 750 g/mol would more effectively eliminate from the body of living organisms as compared to long chain perfluoroaliphatic compounds.

Accordingly, the present invention provides for a fluorochemical composition comprising:

a perfluorinated polyether having a molecular weight between about 750 g/mol and 4000 g/mol and of the formula $$R_f\text{-}(Q\text{-}T_k)_y \quad (I)$$

wherein $R_f$ represents a monovalent or divalent perfluorinated polyether group;

Q is a chemical bond or a divalent or trivalent organic linking group;

T is a functional group selected from —C(O)F, —CO$_2$R$_3$, where R$_3$ is hydrogen, lower alkyl, cycloalkyl or alkanol, —C(O)N(R$_1$)(R$_2$), —OH, —SH, and —NH$_2$ where R$_1$ and R$_2$ are independently lower alkyl, cycloalkyl or alkanol;

k is 1 or 2, and y is 1 or 2, or a mixture thereof.

4. DETAILED DESCRIPTION OF ILLUSTRATIVE EMBODIMENTS OF THE INVENTION

The fluorinated compound used in the fluorochemical composition is of the formula (I):

$$R_f\text{-}(Q\text{-}T_k)_y \quad (I)$$

wherein $R_f$ represents a monovalent or divalent perfluorinated polyether group, Q represents a chemical bond or a divalent or trivalent non-fluorinated organic linking group, T represents a functional group selected from —C(O)F, —CO$_2$R$_3$, where R$_3$ is hydrogen, lower alkyl, cycloalkyl or alkanol, —C(O)N(R$_1$)(R$_2$), —OH, —SH, and —NH$_2$ where R$_1$ and R$_2$ are independently lower alkyl, cycloalkyl or alkanol, k is 1 or 2 and n is 1 or 2.

The term "lower alkyl" includes a straight or branched alkyl group containing 1 to 6 carbon atoms such as, for example, methyl, ethyl, propyl, 1-methyl-2-ethyl, butyl, and the like.

The term "cycloalkyl" includes a cyclic hydrocarbon group of from 3 to 6 carbon atoms such as, for example, cyclopropyl or cyclohexyl, and the like.

The term "alkanol" is a straight or branched chain of methylene groups attached together and being substituted by one or more hydroxyl groups such as, for example, —CH$_2$OH, —CH$_2$CH(OH)CH$_3$, —CH$_2$CH(OH)CH$_2$OH, and the like.

The perfluorinated polyether moiety $R_f$ of the fluorinated polyether of formula (I) preferably corresponds to the formula:

$$R_f^1\text{—}(O\text{—}R_f^2\text{—}(R_f^3)_q)\text{—}_y \quad (II)$$

wherein $R_f^1$ represents a perfluorinated alkyl or alkylene group, $R_f^2$ represents a perfluorinated polyalkyleneoxy group consisting of perfluorinated alkyleneoxy groups having 1, 2, 3 or 4 carbon atoms or a mixture of such perfluorinated alkyleneoxy groups, $R_f^3$ represents a perfluorinated alkylene group, q is 0 or 1 and y is 1 or 2. The perfluorinated alkyl or alkylene group $R_f^1$ in formula (II) may be linear, branched or cyclic and may contain catenary heteroatoms, such as N, O or S, and may contain 1 to 10 carbon atoms, preferably 1 to 6 carbon atoms. A typical perfluorinated alkyl group is CF$_3$—CF$_2$—CF$_2$—. $R_f^3$ is a linear or branched perfluorinated alkylene group that will typically have 1 to 6 carbon atoms. For example, $R_f^3$ is —CF$_2$— or —CF(CF$_3$)—. Examples of perfluoroalkyleneoxy groups of perfluorinated polyalkyleneoxy group $R_f^2$ include:

—CF$_2$—CF$_2$—O—,

—CF(CF$_3$)—CF$_2$—O—,

—CF$_2$—CF(CF$_3$)—O—,

—CF$_2$—CF$_2$—CF$_2$—O—,

—CF$_2$—O—,
—CF(CF$_3$)—O—, and
—CF$_2$—CF$_2$—CF$_2$—CF$_2$—O.

The perfluoroalkyleneoxy group may be comprised of the same perfluoroalkyleneoxy units or of a mixture of different perfluoroalkyleneoxy units. When the perfluoroalkyleneoxy group is composed of different perfluoroalkyleneoxy units, they can be present in a random configuration, alternating configuration or they can be present as blocks. Typical examples of perfluorinated polyalkylene oxy groups include: —[CF$_2$—CF$_2$—O]$_r$—; —[CF(CF$_3$)—CF$_2$—O]$_n$—; —[CF$_2$CF$_2$—O]$_t$—; —[CF$_2$O]$_j$—; —[CF$_2$—CF$_2$—O]$_t$—; and —[CF$_2$CF—(CF$_3$)—O]$_m$—. A preferred perfluorinated polyether moiety that corresponds to formula (II) is CF$_3$—CF$_2$—CF$_2$—O—[CF(CF$_3$)—CF$_2$O]$_n$—CF(CF$_3$)— wherein n is an integer of 3 to 23. This perfluorinated polyether group has a molecular weight of 783 when n equals 3 and can be derived from an oligomerization of hexafluoropropylene oxide. Such perfluorinated polyether groups are preferred in particular because of their benign environmental properties.

Examples of linking groups Q include organic groups that comprise aromatic or aliphatic groups that may be interrupted by O, N or S and that may be substituted, alkylene groups, oxy groups, thio groups, and/or carbonyl groups.

In a particular embodiment, the fluorinated polyether corresponds to the following formula (III):

$$R_f^1\text{—}(O([CF(CF_3)\text{—}CF_2O]_n\text{—}CF(CF_3)\text{-}Q\text{-}T_k)_y \quad (III)$$

wherein $R_f^1$ represents a perfluorinated alkyl or alkylene group, e.g., a linear or branched perfluorinated alkyl group having 1 to 6 carbon atoms, n is an integer of 3 to 23, Q is a chemical bond or an organic divalent or trivalent linking group for example as mentioned for the linking group above, k is 1 or 2, T is as mentioned above and each T may be the same or different, and y is 1 or 2. Particularly preferred compounds are those in which $R_f^1$ represents CF$_3$CF$_2$CF$_2$—. In accordance with a particular embodiment, the moiety Q-T$_k$ is a moiety of the formula —CO—X—R$^a$(OH)$_k$ wherein k is 1 or 2, X is O or NR$^b$ with R$^b$ representing hydrogen or an alkyl group of 1 to 4 carbon atoms, and R$^a$ is an alkylene of 1 to 15 carbon atoms.

Representative examples of the moiety Q-T$_k$ in above formula (III) include:

1. —CONR$^c$—CH$_2$CHOHCH$_2$OH wherein R$^c$ is hydrogen or an alkyl group of for example 1 to 4 carbon atoms;
2. —CH$_2$OH;
3. —CH$_2$OCH$_2$CH(OH)CH$_2$OH;
4. —COOCH$_2$CH(OH)CH$_2$OH; and
5. —CONR$^d$—(CH$_2$)$_m$OH
6. —N(CH$_2$CH$_2$OH)CH$_2$CH$_2$OH
7. —C(O)F
8. —C(O)OR$^d$
9. —CO$_2$H where R$^d$ is hydrogen or an alkyl group such as methyl, ethyl, propyl, butyl, or hexyl and m is 2–12.

Compounds according to formula (III) can for example be obtained by oligomerization of hexafluoropropylene oxide (HFPO) which results in a perfluoropolyether carbonyl fluoride. This carbonyl fluoride may be converted into an acid, acid salt, ester, amide or alcohol by reactions well known to those skilled in the art. The carbonyl fluoride or acid, ester or alcohol derived therefrom may then be reacted further to introduce the desired reactive groups according to known procedures. For example, the alcohol functional group can be converted easily to the (meth)acrylate function by esterification of the alcohol with (meth)acryolyl chloride. Also, EP 870 778 describes suitable methods to produce compounds according to formula (III) having desired moieties -Q-T$_k$. Compounds having moiety 1 listed above can be obtained by reacting the methyl ester derivative of a fluorinated polyether with 3-amino-2-hydroxy-propanol. Compounds having the moiety 5 listed above can be obtained in a similar way by reacting with an amino-alcohol that has only one hydroxy function. For example 2-aminoethanol would yield a compound having the moiety 5 listed above with R$^d$ being hydrogen and m being 2.

Still further examples of compounds according to above formula (I) are disclosed in EP 870 778 or U.S. Pat. No. 3,536,710.

It will be evident to one skilled in the art that a mixture of fluorinated polyethers according to formula (I) may be used to prepare the fluorinated polyether compound of the fluorochemical composition. Generally, the method of making the fluorinated polyether according to formula (I) for the present invention will result in a mixture of fluorinated polyethers that have different molecular weights and are free of (1) fluorinated polyether compounds having a perfluorinated polyether moiety having a molecular weight of less than 750 g/mol and (2) fluorinated polyether compounds having a polyfluorinated polyether moiety having a molecular weight greater than 4000 g/mol.

The use of fluorinated polyethers corresponding to molecular weights greater than about 4000 g/mol can induce processing problems. These problems are typically due to the fact that the higher molecular weight materials lead to emulsion, instability and insolubility concerns. Additionally, the presence of higher molecular weight fluorinated polyether derivatives has considerable impact on the efficiency of the separation process of materials via fractionation.

The fluorochemical composition will be free of or substantially free of perfluorinated polyether moieties having a molecular weight of less than 750 g/mol and those moieties having a molecular weight greater than 4000 g/mol. By the term "substantially free of" is meant that the particular perfluorinated polyether moieties outside the molecular weight range are present in amounts of not more than 10% by weight, preferably not more than 5% by weight and most preferably not more than 0.05% by weight based on the total weight of perfluorinated polyether moieties in the composition. Compositions that are free of or substantially free of these moieties are preferred because of their beneficial environmental properties and their processability in the further reaction steps.

The present fluorinated polyether compounds may be used as intermediates for preparing fluorinated compositions for treating substrates such as hard surfaces or fibrous substrates such as textiles.

The present perfluorinated polyether compounds prepared by known methods but having molecular weight greater than 750 g/mol and less than 4000 g/mol are made free of those moieties outside the molecular weight range by careful fractional distillation or azeotropic distillation using aprotic organic solvents, such as diglyme, or by careful control of the oligomerization parameters such as catalyst choice, catalyst amount, temperature, solvent, and purity of starting materials and starting materials ratios.

EXAMPLES

The average molecular weight (MW$_{avg}$) of the HFPO oligomers was determined by summation of the product of the glc area % for each individual oligomer and its corresponding molecular weight.

HFPO Oligomer General Formula: $C_3F_7O[CF(CF_3)CF_2O]_nCF(CF_3)COF$

Example 1

HFPO Oligomer with n≧5

A mixture of HFPO oligomers (460 grams, $MW_{avg}$~1336 with 13.5% hexamer and below, as determined by glc; can be prepared as described in U.S. Pat. No. 3,242,218), was vacuum fractionated using a silver coated vacuum jacketed column (61 cm length and 25.4 mm I.D.; available from Ace Glass Incorporated, Vineland, N.J.), and packed with Pro-Pak distillation packing (0.24 in (6.0 mm) available from Ace Glass Incorporated). A 1 L distilling flask (available from Ace Glass Catalog # 6935-78) equipped with a distilling head (available from Ace Glass Incorporated; Catalog # 6598-10), magnetic stirrer, and a dry ice-acetone slush bath (to collect distillate) was used. The distillation was carried out at a vacuum of 0.1 mmHg. Vacuum was broken if necessary during the distillation using dry nitrogen. The column was equilibrated for 1-hour at total reflux before distillate was removed at a 60 to 1 reflux ratio; that is to say, 60 parts returned to the column and 1 part was removed as distillate. Distillate was removed up to a column head temperature of 140° C./0.1 mmHg and 130 grams of distillate was recovered which contained 42 grams of diglyme as a top phase. After cooling, the overhead and column were removed and replaced with an addition funnel, all under a nitrogen blanket. Anhydrous methanol (28 g.) was slowly added dropwise while maintaining the reaction temperature under 30° C. After thirty minutes, deionized water (34 g) was added and the resulting methyl ester solution washed and the phases separated. The desired methyl ester formed the lower phase (284 g) of material and contained only 0.19% HFPO hexamer as determined by glc and which had $MW_{avg}$ of 1434 g/mole.

Example 2

HFPO Oligomer with n=4 and 5 (Hexamer and Heptamer)

A mixture of HFPO oligomers was fractionated as described in Example 1 to obtain a 182 gram fractionation cut containing 65% hexamer and 33% heptamer as determined by glc. This cut was redistilled under vacuum using a concentric tube column (available from Ace Glass Incorporated, Catalog # 9331-12). The following table summarizes this fractionation performed using a 7 to 1 reflux ratio and a vacuum of 0.5 mmHg (66.7 Pa).

TABLE 1

Summary of Fractionations.

| Cut# | Distillation Head Temperature (° C.) | Distillate Amount (g) | Hexamer (%) | Heptamer (%) |
|---|---|---|---|---|
| 1 | N/R* | 10.0 | 94.05 | 0.18 |
| 2 | N/R | 17.0 | 95.54 | 2.71 |
| 3 | N/R | 9.0 | 95.70 | 2.74 |
| 4 | N/R | 14.0 | 95.20 | 3.64 |
| 5 | 120 | 23.0 | 95.20 | 3.45 |
| 6 | N/R | 24.0 | 65.50 | 31.90 |
| 7 | 160 | 20.0 | 2.20 | 95.70 |

*not recorded
Cuts 2–5 were combined and the methyl ester prepared as previously described. The resulting product was 95.0% hexamer methyl ester as analyzed by glc.
Cut 7 was used to prepare the 95.0% pure heptamer methyl ester by the same procedure as used for the hexamer.

Example 3

HFPO Oligomer with n=2 (Tetramer)

One hundred milliliters of crude HFPO oligomers containing 27% tetramer as determined by glc and prepared as described in Example 1, was fractionated at atmospheric pressure using the same concentric tube column described in Example 2. A 20-gram tetramer distillation cut was obtained using a 30 to 1 reflux ratio at 160° C. head temperature. Following esterification with anhydrous methanol and water washing, 20 grams of tetramer at 94.5% glc purity was obtained.

Example 4

HFPO Oligomer with n=3 (Pentamer)

A sample of HFPO oligomer methyl esters was distilled (3 mmHg) in the packed column distillation apparatus essentially identical to that described in Example 1. A fraction was obtained as the pot temperature was raised from 144 to 185° C. which contained 31.4% of the pentamer by glc. This fraction was redistilled and the fraction boiling at 118° C./8 mmHg obtained which comprised the pentamer methyl ester in a purity of 95.1% by glc.

Example 5

HFPO Oligomer with n≧4

A sample of HFPO oligomer methyl esters was prepared as described in Example 1 and which was found to contain about 0.3% by weight HFPO trimer (n=1) and about one tenth that amount HFPO dimer (n=0). To this sample was added 50 ml anhydrous diglyme and the mixture distilled at atmospheric pressure. After a few milliliters of distillate was obtained, the material remaining in the distillation vessel was analyzed by glc and found to contain no more than about 84 ppm of the trimer. This material was washed several times with anhydrous methanol to remove the residual diglyme. The $MW_{avg}$ was 1742.

Example 6

HFPO Oligomer with n≧5.

This sample was prepared essentially as described in Example 1 to obtain a sample of HFPO oligomers of $MW_{avg}=1648$ containing only 22 ppm of the tetramer and no lower homologs.

Example 7

Preparation of the Alcohol:
$C_3F_7O[CF(CF_3)CF_2O]_nCF(CF_3)CONHC_2H_4OH$

The HFPO methyl esters described in Examples 1–6 were converted to the amide alcohols in very similar manners. The ester was mixed at ambient temperature with excess ethanolamine (about 1.25 moles ethanolamine per mole ester). After stirring for 16 hours, the solution was completely homogeneous. The co-product methanol was then removed by placing the sample under vacuum, typically 10–15 mmHg at about 50° C. until the foaming caused by the removal of the methanol had essentially stopped. This procedure did not remove the excess ethanolamine but this did not interfere with the biological testing. For the ester of Example 6 a slightly different procedure was employed. The product mixture after reaction of the ester with excess ethanolamine was dissolved in about 200 ml diethyl ether. The ether solution was then washed twice with about 5% aqueous sodium chloride and once with about 2N HCl and again twice with the sodium chloride solution. After drying the ether solution over anhydrous magnesium sulfate, the ether was removed by rotary evaporation at about 15 mmHg and 50° C. until no more foaming was observed. GC-MS and IR confirmed the structure of the alcohol products.

Comparative Example C1 and Examples 1–5

Toxicokinetic Study with HFPO alcohols: $CF_3CF_2CF_2O(CF(CF_3)CF_2O)_xCF(CF_3)C(O)N(H)CH_2CH_2OH$ The objective of this study was to assess the oral absorption and serum elimination half-life of six hexafluoropropylene oxide (HFPO)-alcohol oligomers $(CF_3CF_2CF_2O(CF(CF_3)CF_2O)_xCF(CF_3)C(O)N(H)CH_2CH_2OH)$, or mixtures thereof, in rats. Male Sprague-Dawley rats (N=4 to 6 rats per dose group) received a single 30 mg/kg dose of the various HFPO alcohol oligomers in propylene glycol by oral gavage at a volume of 5 ml/kg. Necropsies were performed on day one and day four post dose.

Serum samples obtained at necropsy were analyzed for total fluorine based on published methods (1) using an Antek 9000F Fluoride Analysis System. The method was based on oxy-pyrohydrolysis at 1050° C., whereby the C—F bond is broken and the resulting product, hydrogen fluoride (HF), is trapped in a buffer solution and measured with the fluoride ion electrode. The total fluorine levels obtained by this method reflect the total organic fluorine in the serum samples and are reported in Table 2.

These data indicate that the apparent half-life serum fluorine levels for the HFPO alcohol example C1 is approximately four days. The HFPO alcohol oligomers with average molecular weights of 750 g/mole or greater (examples 1–5) were not apparent in the serum on day one or day four post-dose as measured by total organic fluorine suggesting that these higher molecular weight oligomers have a relatively lower to no bioavailability as compared to the C1 example.

TABLE 2

Total Fluorine found in male rat serum after a single oral dose of HFPO-alcohol oligomers $(CF_3CF_2CF_2O(CF(CF_3)CF_2O)_xCF(CF_3)C(O)N(H)CH_2CH_2OH)$.

| Example | x | $MW_{avg}$ | Day 1 Post-Dose | Day 4 Post-Dose |
|---|---|---|---|---|
| C1 | 2 | 705 | 7.55 (1.34) | 3.90 (0.00) |
| 1 | 3 | 871 | 0.15 (0.00) | 0.15 (0.00) |
| 2 | 4 | 1037 | 0.15 (0.00) | 0.15 (0.00) |
| 3 | 5 | 1203 | 0.15 (0.00) | 0.15 (0.00) |
| 4 | $2 \leq x \leq 11$ | 1354 | 0.15 (0.00) | 0.15 (0.00) |
| 5 | $5 \leq x \leq 11$ | 1460 | 0.15 (0.00) | 0.15 (0.00) |

Amount of Total Fppm (SD) in serum

The limit of detection (LOD) was 0.3 ppm, therefore the standard FDA approach of using one-half the LOD was used to calculate averages.

References
1. Van Gogh, H., *Pharm. Weeblad*, 1966, 101, 881–898

What is claimed is:

1. A fluorochemical composition comprising a fluorinated polyether having a molecular weight between about 750 g/mol and about 4000 g/mol, said fluorinated polyether being substantially free of fluorinated polyethers having a molecular weight of less than 750 g/mol and greater than 4000 g/mol, and wherein said fluorinated polyether is of the formula:

$R_f^1$—[O—[CF($CF_3$)—$CF_2O]_n$—CF($CF_3$)-Q-$T_k$]$_y$ wherein $R_f^1$ represents a perfluorinated alkyl or alkylene group, n is an integer of 3 to 23, Q is an organic divalent or trivalent linking group selected from the group consisting of alkylene, oxyalkylene, aminoalkylene, and carboxyalkylene and T is selected from the group consisting of —OH, —SH, $NH_2$, —C(O)F, —$CO_2R_3$, where $R_3$ is hydrogen, lower alkyl, cycloalkyl or alkanol, and —C(O)N($R_1$)($R_2$), where $R_1$ and $R_2$ are independently lower alkyl, cycloalkyl or alkanol; k is 1 or 2, and y is 1 or 2.

2. A composition according to claim 1 wherein y is 1.

3. A composition according to claim 1, wherein the amount of polyether outside the molecular weight range of 750 g/mol and 4,000 g/mol is not greater than 10% by weight based on the total weight of polyether in the composition.

4. A composition according to claim 1, wherein the amount of polyether outside the molecular weight range of 750 g/mol and 4,000 g/mol is not greater than 5% by weight based on the total weight of polyether in the composition.

5. A composition according to claim 1, wherein the amount of polyether outside the molecular weight range of 750 g/mol and 4,000 g/mol is not greater than 0.05% by weight based on the total weight of polyether in the composition.

* * * * *

UNITED STATES PATENT AND TRADEMARK OFFICE
CERTIFICATE OF CORRECTION

PATENT NO. : 6,923,921 B2
APPLICATION NO. : 10/331816
DATED : August 2, 2005
INVENTOR(S) : Richard M. Flynn It is certified that error appears in the above-identified patent and that said Letters Patent is hereby corrected as shown below:

Cover Page
Column 2, under "Other Publications", last line, delete "Weehlad" and insert --Weeblad--, therefor.

Column 3
Line 28, delete "$R_f^1-(O([CF(CF_3)-CF_2O]_n-CF(CF_3)-Q-T_k)_y$" and insert -- $R_f^1-(O[CF(CF_3)-CF_2O]_n-CF(CF_3)-Q-T_k)_y$ --, therefor.

Column 8
Line 20, Delete "References" and insert --Reference:--, therefor.
Line 21, after "898" insert --.--.

Signed and Sealed this

Twenty-fourth Day of April, 2007

JON W. DUDAS
*Director of the United States Patent and Trademark Office*